United States Patent [19]

Capelle et al.

[11] Patent Number: 5,127,741
[45] Date of Patent: Jul. 7, 1992

[54] HIGH-PERFORMANCE EXTRUDER

[75] Inventors: Gerd Capelle, Langenhagen; Gunther Meier, Hanover, both of Fed. Rep. of Germany

[73] Assignee: Hermann Berstorff Maschinenbau GmbH, Hanover, Fed. Rep. of Germany

[21] Appl. No.: 693,225

[22] Filed: Apr. 29, 1991

[30] Foreign Application Priority Data

Dec. 14, 1990 [DE] Fed. Rep. of Germany ....... 4039942

[51] Int. Cl.⁵ .............................................. B29C 47/62
[52] U.S. Cl. ...................................... 366/80; 264/349; 366/89; 366/90; 425/208
[58] Field of Search ............... 425/208, 135, 145, 146, 425/169, 170, 203, 205, 207, 209, 376.1, 382.4; 366/79, 89, 80, 88, 90; 264/349

[56] References Cited

U.S. PATENT DOCUMENTS

| 3,613,160 | 10/1971 | Loomans et al. .................... 425/209 |
| 4,462,692 | 7/1984 | Meyer ..................................... 366/89 |
| 4,640,672 | 2/1987 | Ellwood ................................. 425/208 |

FOREIGN PATENT DOCUMENTS

| 1142839 | 6/1956 | Fed. Rep. of Germany . |
| 2235784 | 7/1972 | Fed. Rep. of Germany . |
| 3003615 | 2/1980 | Fed. Rep. of Germany . |

*Primary Examiner*—Jay H. Woo
*Assistant Examiner*—William J. Matney, Jr.
*Attorney, Agent, or Firm*—Foley & Lardner

[57] ABSTRACT

A high-performance extruder is provided, wherein the pin-barrel and transfer mix mixing sections, which are known per se and have only been used individually hitherto, are jointly used in one extruder. The combination of both mixing systems permits the throughput of material to be increased in a surprising manner by 60% to 100%, while a constant mixing quality is maintained and the driving torque is halved.

6 Claims, 1 Drawing Sheet

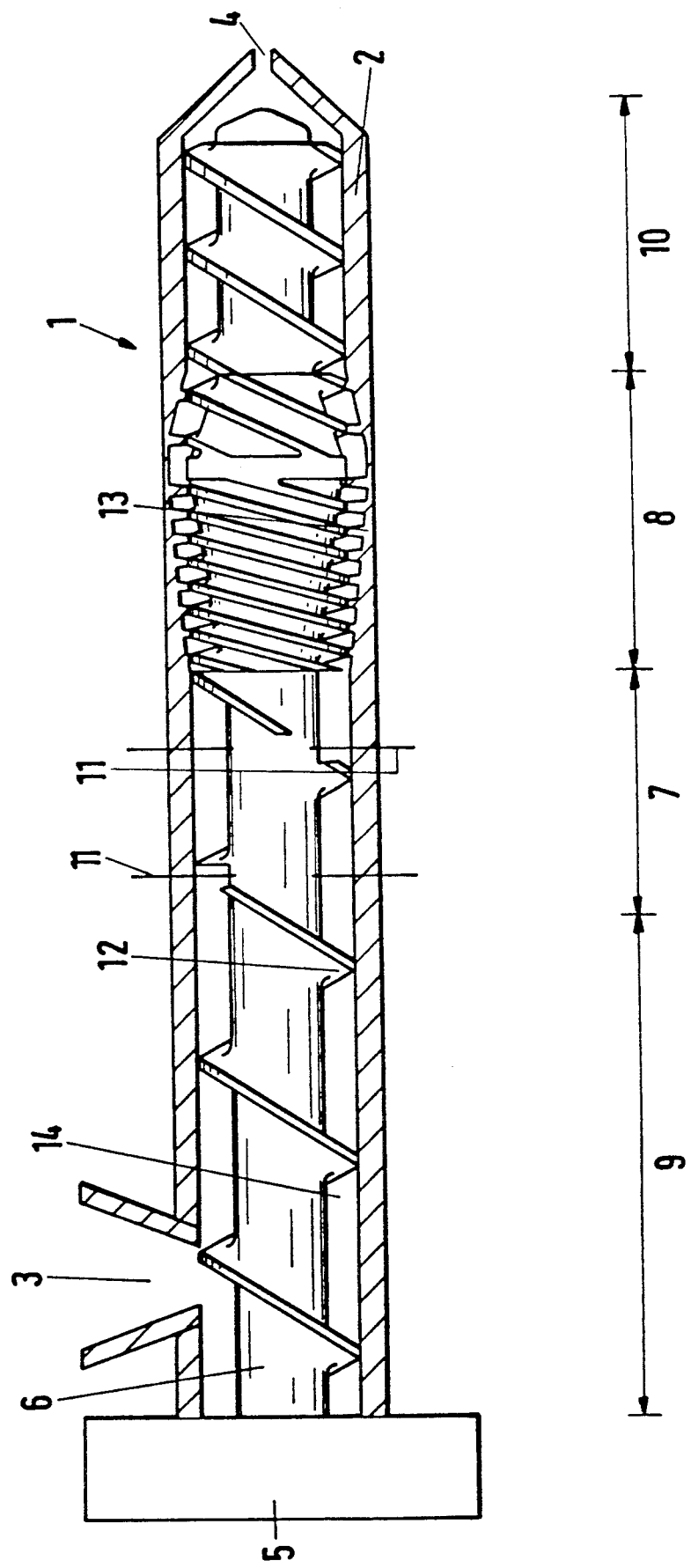

HIGH-PERFORMANCE EXTRUDER

BACKGROUND OF THE INVENTION

The invention relates to an extruder for processing and producing rubber and thermoplastic plastics materials.

In the field of extruder technology, it has long been known to construct an extruder so that metal pins protrude through its housing into the processing chamber for processing the extruded material in mixing sections. In addition, the flights of the extruder screw are interrupted at the locations where the pins protrude into the extruder housing. Such extruders are known, for example, from German Offenlegungsschrift No. 2 235 784 or German Offenlegungsschrift No. 3 003 615.

These extruders are distinguished by their very good mixing and homogenising effect upon the material to be processed and permit also an increased throughput of material through the extruder per unit of time whilst the r.p.m. of the screw remains constant. These advantages have resulted in pin-barrel extruders becoming the most commonly used mixing and homogenising extruders in the last 15 years (not least as a consequence of constant improvement).

Independently of this, a mixing section for an extruder has been developed, which has become known as a transfer mix mixing section (DE-A 11 42 839). This mixing section is substantially characterised in that both the extruder screw and the internal wall of the extruder housing are provided with grooves and flights over a predetermined length, the thread depth of the extruder screw, when viewed in the longitudinal direction of the extruder housing, decreasing to zero and subsequently increasing again at the same rate as the thread depth of the grooves in the housing respectively increases and decreases again. As a result of this configuration for the extruder screw and housing, the extruded material can be conveyed from the screw grooves into the housing grooves, thereby having a good mixing effect upon the extruded material, and such conveyance is complete when the mixing section rotates.

Compared with the pin-barrel extruder, the transfer mix extruder could claim for itself a certain corner of the market, especially when the overall length of the extruder had to be kept small. However, the comparatively high cost of manufacture of the mixing section is a disadvantage of such a construction.

SUMMARY OF THE INVENTION

Since the technology for such mixing sections of extruders has not changed in the last 15 to 20 years, apart from detail improvements, the basic object of the invention was to create a new generation of mixing and homogenising extruders on the basis of known apparatus.

As a result of combining the two known basic technologies regarding mixing sections, it was possible to create an extruder having considerable advantages over the mixing and homogenising extruders of the described prior art.

Thus, by utilising a laboratory extruder which has a pin-barrel section and a transfer mix section, it has been possible to ascertain that, while retaining the same mixing quality and the same screw r.p.m., the driving performance of the extruder could be reduced by 50%, and the throughput of material could be increased by 60% to 100%.

These excellent results also produce a 50% reduction in the driving torque, thereby resulting in a considerable reduction in the drive costs. In addition, as a result of combining the pin-barrel mixing section and the transfer mix mixing section in accordance with the invention, the overall length of the mixing section required for the same mixing quality can be reduced by approximately 50% compared with an extruder which operates only according to the pin-barrel principle.

BRIEF DESCRIPTION OF THE APPLICATION DRAWING

The invention will be described by reference to the application drawing, which comprises a longitudinal section view of a single screw extruder constructed in accordance with the invention.

One extruder screw 6 is disposed internally of the extruder housing 2 and is drivable about its longitudinal axis by a drive unit 5. In the region of its upstream end, the housing 2 has an inlet opening 3 for receiving the material which is to be extruded with the material leaving the extruder, ready mixed, through the outlet opening 4.

In the feed section 9, the extruder screw 6 has a screw geometry which is suitable for drawing into the extruder, in a manner known per se, the material which has been supplied through the inlet opening 3 and for plasticising such material.

A pin-barrel section 7 is provided downstream of this feed section 9, and in said pin-barrel section two rows of pins schematically shown at 11 protrude radially through the extruder housing 2 towards the screw core and into the processing chamber 14 of the extruder. The screw flights 12 are interrupted in known manner in the pin plane in this section 7, in order to avoid colliding with the pins 11.

Downstream of the pin-barrel section 7, there is disposed a transfer mix section 8, wherein, in this embodiment, the angles between the flights 12 of the extruder screw 6 and the flights 13 of the extruder housing 2 are greater than or equal to 105° and do not form any angles with one another which are complementary to 90°.

The final processing section of the extruder screw 6 is formed by the pressure increasing section 10, in which the screw geometry is so selected that the pressure of the molten mass can be increased to the required tool pressure in known manner.

In addition to this embodiment, other possible embodiments are also conceivable for this high-performance extruder. Thus, for example, the transfer mix section 8 could also be disposed upstream of the pin-barrel section 7, although the illustrated embodiment produces better mixing and homogenising results. In addition, it may be mentioned here that the pin-barrel section also fulfils its mixing and homogenising task with more than the two illustrated rows of pins. In view of the ratio between costs and mixing quality, it is best to provide the pin-barrel section with one to five rows of pins.

The preferred length of the individual extruder sections, with an extruder length of 10 screw diameters (D), is substantially 3 D for the feed section, 1.5 to 2 D for the pin-barrel section, 2 to 2.5 D for the transfer mix section, and approximately 3 D for the pressure augmenting section.

Independently of these particulars, however, additional processing sections may also be disposed upstream of, downstream of or between the pin-barrel and transfer mix sections, such as, for example, degassing or kneading sections.

We claim:

1. An extruder for processing and producing rubber and thermoplastic plastics material, comprising:

an elongated extruder housing defining a feed section in which a feed inlet is provided for feeding material to the extruder, and an outlet section having a material outlet opening for discharging molten material under pressure from the extruder, an extruder screw having a screw core and a helical flight, said screw being mounted for rotation in said housing about the longitudinal axis of said screw, said housing and said screw core defining therebetween a processing chamber, and means for driving said screw, said housing further defining a pin-barrel section in which at lest one row of pins extend radially inwardly of the housing through the processing chamber toward the core of said screw, said helical flight of said screw being interrupted in the regions of said pins so as to accommodate rotation of said screw in such region, and a transfer mix section defined by said housing longitudinally adjacent said pin-barrel section, the helical flight of said screw in said transfer mix section being constructed so that the thread depth of the areas between adjacent flight sections first decreases toward zero and then increases from the feed side of the mix section to the outlet side, and wherein said housing in said transfer mix section is also formed with a helical flight generally aligned with the helical flight of said screw, said helical flight of said housing defining between adjacent flight sections thereof grooves which vary in depth and which are radially aligned with the area between adjacent flight sections of said screw, the depth of said grooves between adjacent flight sections of said housing first increasing and then decreasing from the feed side of the mix section to the outlet side, and being generally inversely proportional to the thread depth between radially adjacent flight sections of said screw.

2. An extruder according to claim 1, wherein said pin-barrel section is disposed upstream of the transfer mix section.

3. An extruder according to claim 1, wherein said feed section is upstream of the said pin-barrel section and said transfer mix section, and wherein material is extruded from said outlet section at the required tool pressure.

4. An extruder according to claim 1, wherein the length of said extruder is approximately 10 screw diameters (D), the length of said feed section is 3 D, the length of said pin-barrel section is 1.5 to 2 D, the length of said transfer mix section is 2 to 2.5 D, and the length of the outlet section where pressure is increased is substantially 3 D.

5. An extruder according to claim 1, wherein a plurality of rows of pins are disposed in said pin-barrel section, said pins protruding radially into the processing chamber of the extruder housing, the screw flights of said screw being interrupted at the locations of said pins.

6. An extruder according to claim 1, wherein in said transfer mix section, the angles between the flights of the extruder screw and the flights of the extruder housing are greater than or equal to 105° and do not form any angles which are complementary to 90°.

* * * * *